United States Patent [19]
Jourquin et al.

[11] Patent Number: 5,108,687
[45] Date of Patent: Apr. 28, 1992

[54] DEVICE AND METHOD FOR AT LEAST PARTIALLY ENCAPSULATING A SUBSTANTIALLY SHEET SHAPED ELEMENT

[75] Inventors: Lucien Jourquin, Wetteren; Guy Malfliet, Hamme; Bernard Debaes, Damme-Sijsele, all of Belgium

[73] Assignee: Recticel, Belgium

[21] Appl. No.: 398,608

[22] Filed: Aug. 25, 1989

[30] Foreign Application Priority Data

Aug. 26, 1988 [EP] European Pat. Off. ........ 88201824.5

[51] Int. Cl.⁵ .......................................... B29C 45/14
[52] U.S. Cl. .................................. 264/279; 249/65; 249/95; 264/252; 264/276; 264/328.9; 425/116; 425/129.1
[58] Field of Search .................... 425/116, 117, 129.1; 264/252, 279, 275, 276, 328.9; 249/83, 90, 95, 65, 85

[56] References Cited

U.S. PATENT DOCUMENTS

| | | | |
|---|---|---|---|
| 4,543,283 | 9/1985 | Curtze et al. | 428/38 |
| 4,561,625 | 12/1985 | Weaver | 425/116 |
| 4,584,155 | 4/1986 | Zanella | 264/252 |
| 4,626,185 | 12/1986 | Monnet | 264/252 |
| 4,662,113 | 5/1987 | Weaver | 264/252 |
| 4,688,752 | 8/1987 | Barteck et al. | 425/116 |
| 4,732,553 | 3/1988 | Hofer | 425/116 |
| 4,854,599 | 8/1989 | Barteck | 425/116 |
| 4,951,927 | 8/1990 | Johnston et al. | 264/252 |
| 4,999,147 | 3/1991 | Kojima et al. | 264/252 |

FOREIGN PATENT DOCUMENTS

| | | |
|---|---|---|
| 0076924 | 4/1983 | European Pat. Off. . |
| 0127546 | 12/1984 | European Pat. Off. . |
| 0128379 | 12/1984 | European Pat. Off. . |
| 832520 | 2/1952 | Fed. Rep. of Germany . |
| 2559181 | 7/1977 | Fed. Rep. of Germany . |
| 87/04973 | 8/1987 | PCT Int'l Appl. . |
| 1533404 | 11/1978 | United Kingdom . |

Primary Examiner—James C. Housel
Attorney, Agent, or Firm—Sughrue, Mion, Zinn, Macpeak & Seas

[57] ABSTRACT

A device for at least partially encapsulating a border of a substantially sheet shaped element, and including a mould having at least two parts for pressing therebetween the element. The mould has a shape such that, when the element is pressed between the parts of the mould, a cavity is formed around the border. The device has an injection opening for injecting a moulding substance into the cavity. The cavity is formed by an elastically deformable member having a profile which extends along an encapsulation borderline of the element and which is adapted to be elastically deformed while maintaining a tight contact along the encapsulation borderline when pressure is applied thereon in order to follow irregularities in the element along the borderline. Also, a method for at least partially encapsulating a border of a substantially sheet shaped element.

9 Claims, 5 Drawing Sheets

DEVICE AND METHOD FOR AT LEAST PARTIALLY ENCAPSULATING A SUBSTANTIALLY SHEET SHAPED ELEMENT

BACKGROUND OF THE INVENTION

The invention relates to a device for at least partially encapsulating a border of a substantially sheet shaped element, said device comprises a mould having at least two parts for pressing there between said element, said mould being provided with means for forming, when said element is pressed between parts of said mould, a cavity around said border, said device further comprising injection means for injecting a moulding substance into said cavity.

Such a device is generally used for encapsulating the border of, for example, windows for automobiles. The manufactured sheet of glass is brought between the parts of a mould in order to encapsulate at least a part of a border of the window. Generally flexible plastic gaskets are used for that purpose.

When the mould is closed and the sheet shaped element is pressed between the parts of the mould, there is formed a hollow cavity around the part of the border to be encapsulated. In said cavity a moulding substance is injected in order to form a ring of elastomer around the glass, which serves to make a junction, having preferably an aerodynamical profile, between the car body and the sheet of glass.

A drawback of the known device is that, due tot he fact that the used sheet shaped elements always show irregularities at their surface, e.g. thickness variation and changes of bending radius, the encapsulation can not correctly be realised.

As more and more automobile windows have bended surfaces in two directions, the encapsulation technique becomes more and more complex.

In the existing technique elastomer gaskets, such as rubber blocks, are used, which are embodied in the mould surfaces in order to form at least a part of the cavity. These gaskets also serve to prevent the flow of the moulding substance out of said cavity. These elastomer gaskets have the disadvantage of imperfect parting lines, since they tend to camber when to much pressure is applied thereon. Further they also need regular cleaning and maintenance, and their life time is limited. Due to these deficiences of the elastomer gaskets, leakages of the moulding substance are creating flashforming at the surroundings of the element to be encapsulated. These flashes need than to be removed, which implies additional costs and causes damages on the element to be encapsulated.

SUMMARY OF THE INVENTION

It is an object of the invention to realise an encapsulating device wherein said flashforming is substantially reduced.

Thereto a device according to the invention is characterised in that said means for forming said cavity comprise an elastically deformable member having a profile which extends along an encapsulation borderline of said element and which is provided to be elastically deformed while maintaining a tight contact along said encapsulation borderline when a pressure is applied thereon in order to follow irregularitues in said element along said borderline. By means of the pressure applied on said elastically deformable member, said member will be elastically deformed and will follow the variation of the glass thickness and bending radius. The profile will also be bend along the encapsulation borderline, thus causing a tightly packing between the member and the element to be encapsulated. Due to that tight packing flashforming is now prevented.

In a preferred embodiment a device according to the invention is characterised in that, said member is formed by an elastically deformable metal ring, preferably a floating steel ring. Such a metal ring has excellent elastic properties, which makes him particularly suitable for deformation. Further a metal ring is a hard material having a considerable life time.

In another preferred embodiment of a device according to the invention, at least one land face of said member is somewhat oblique with respect to the element on which it is applied, respectively to a part of the mould. Thus the edges beside the cavities formed by the element and the member touch first the element surface respectively the surface of the mould and provide a sharp ending of the encapsulation profile which thus prevents flashforming.

A further embodiment a device according to the invention is characterised in that bellows are fixed on at least one of said parts of said mould for applying a pressure on said member, said bellows extending substantially along said member around the border thereof. By using bellows the force can be proportioned in function of surface variations of the element to be encapsulated.

Preferably said member is provided with longitudinal and/or transversal grooves in a surface opposite to the one coming into contact with said element. Those grooves situated at the bellow side improve the flexibility of the member.

The invention also relates to a method for at least partially encapsulating a border of a substantially sheet shaped element. The method according to the invention is characterised in that in order to form said cavity an elastically deformable member having a profile which extends along an encapsulation borderline of said element being pressed and deformed while maintaining a tight contact along said encapsulation borderline before said moulding substance is injected, in order to follow irregularities in said element along said borderline.

Further details of the invention will now be given by way of an example showed in the drawing. It will be clear that the invention is not limited to the given example and that several modifications within the scope of the invention are possible.

DESCRIPTION OF PREFERRED EMBODIMENTS

Figure 1:
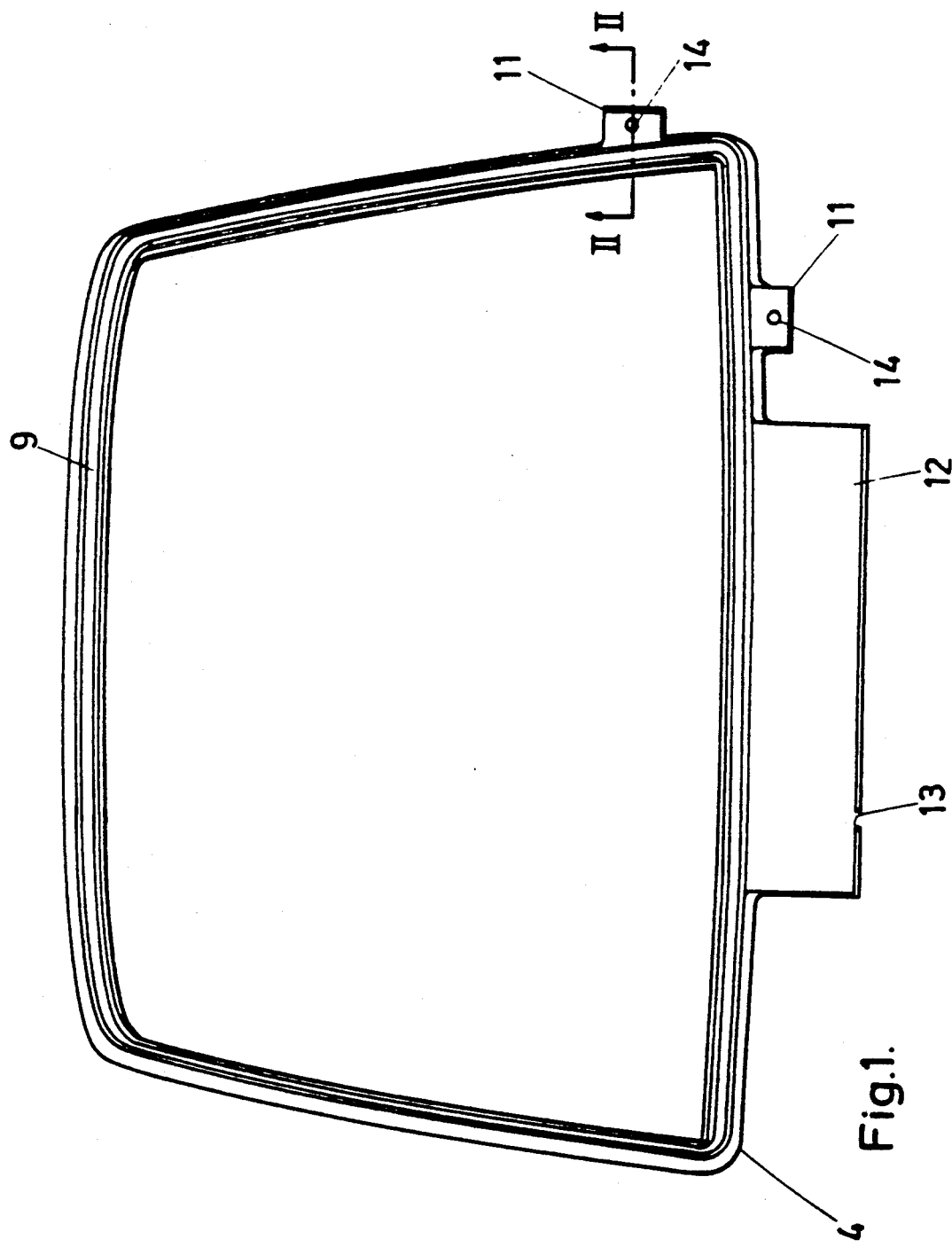
FIG. 1 shows a plane view of an elastically deformable metal ring according to the invention.

In the drawings, the same reference numbers relate to the same or analogous elements.

Figure 2:
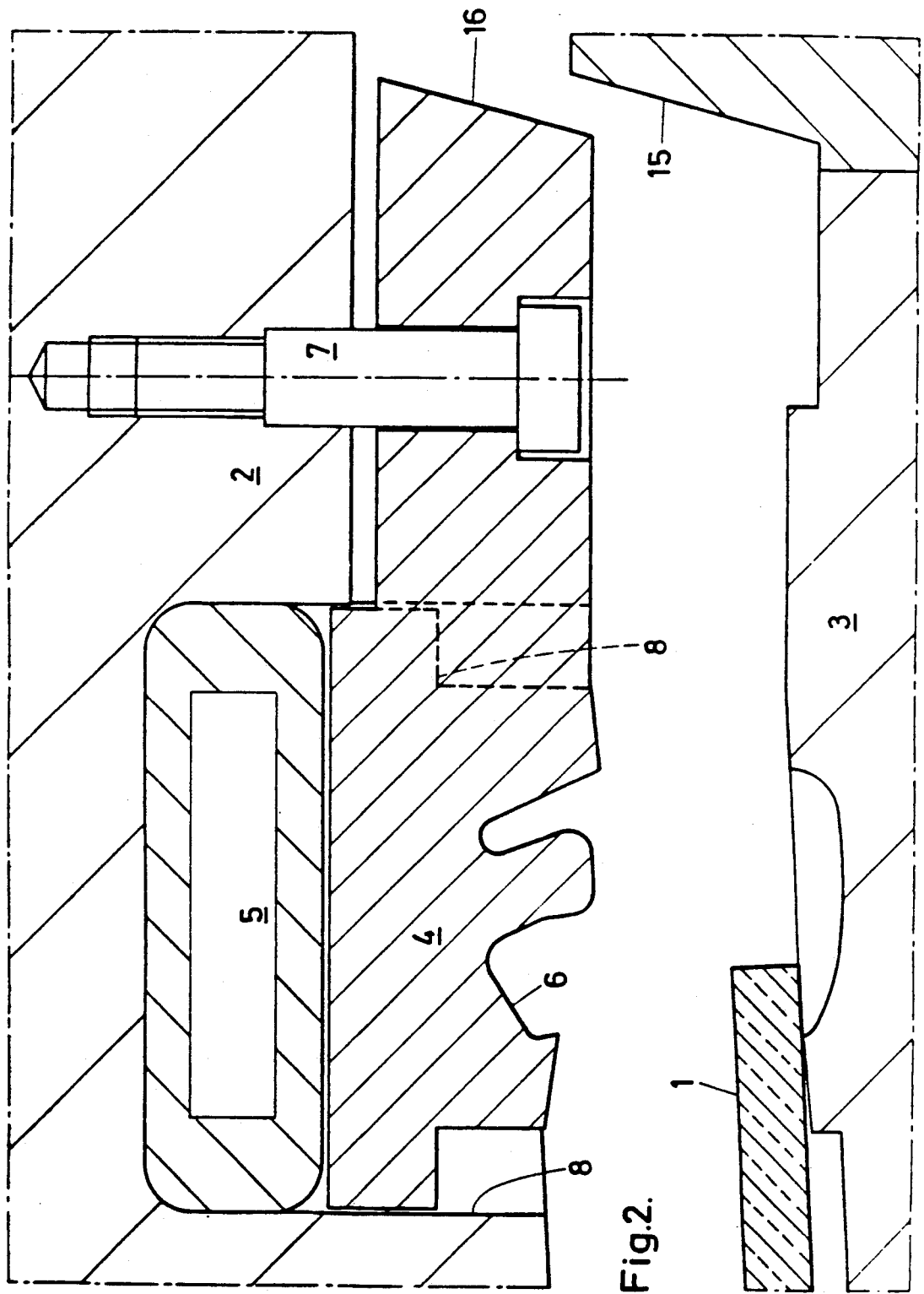
FIG. 2 shows a cross-section view (along the line II—II of FIG. 1) in its open state of a device according to the invention.

The device shown in cross-section in FIG. 2 comprises an uppermould 2 and a undermould 3. A sheet shaped element 1, for example a sheet of glass or a sheet of plastic, is put on the undermould. The uppermould is provided with bellows 5 which, when blown up, apply a pressure on a member 4, which is located in a groove 8 of the mould. Preferably there is left a gap, for example of 0.2 mm thickness, between the member 4 and the uppermould 2. This is done for a frictionless movement of the member 4 in the groove 8 and for assuring that the belows can not stick into the gap between the member and the uppermould. When the mould is open, as is shown in FIG. 2, the member 4 is kept in place by means of the bolts 7.

The member 4 as shown in FIG. 1, is formed by an elastically deformable member made of a hard and wear resistant material, preferably a metal ring or a floating steel ring which at its underside shows a profile (FIG. 2) 6. Various profiles 6 are possible, each of them being each time adapted to form an encapsulation profile which fits into the profile of the frame into which the sheet shaped element has to be embedded.

As is illustrated in FIG. 1 the outer circumference of the member 4 is adapted to fit with the outer circumference of the element to be encapsulated. In the chosen example the ring 4 shows the shape of the window of an automobile.

The member 4 is provided with projections 11 having a hole 14 through which the bolt 7 passes. Those projections serve to fix the member on the mould. The member 4 is also provided with an injection aperture 13 through which a moulding substance is injected. The injected moulding substance is applied to a buffer 12 from which it passes to a cavity 9 formed by the profile 6 of said member 4.

Figure 4:
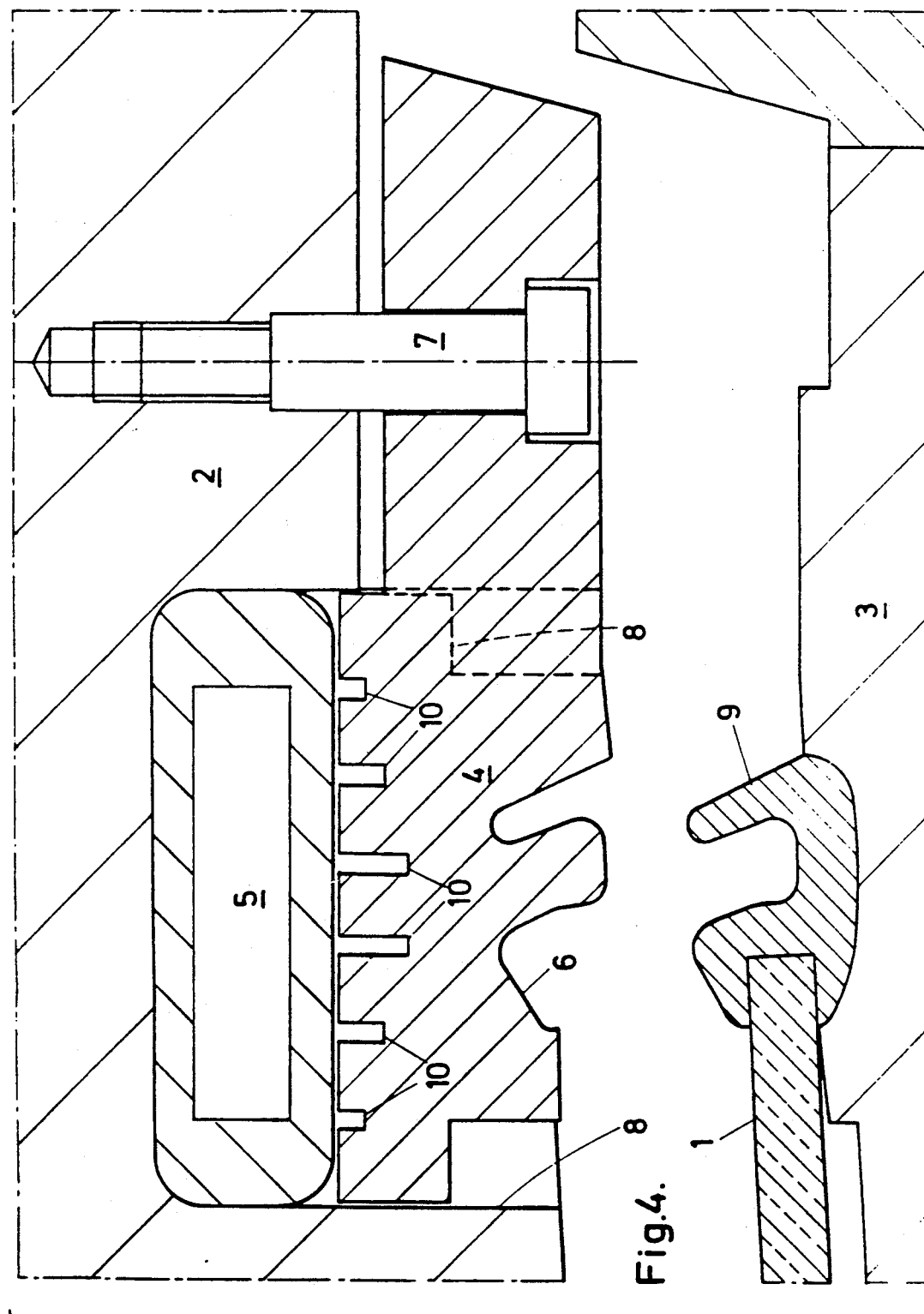
FIG. 4 shows an analogous cross-section as the one illustrated in FIG. 2, but using an encapsulation member provided with longitudinal grooves.

Preferably the ring is provided with longitudinal grooves 10 in its upper surface, such as shown in FIG. 4. These grooves improve the flexibility of the metal ring. The grooves must be filled up afterward for example with plastic strips, to become again a smooth surface on which the bellows presses.

Figure 5:
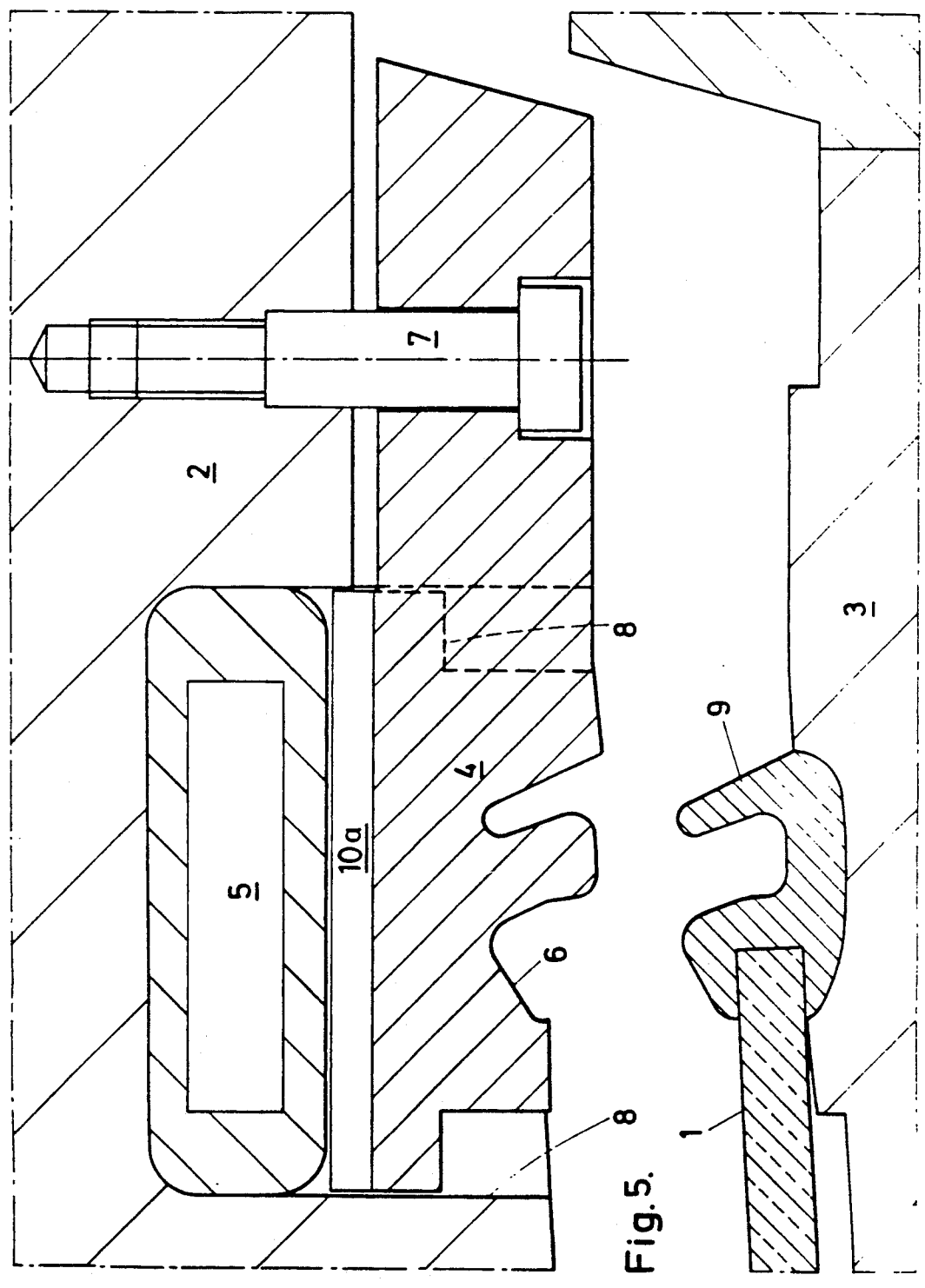
FIG. 5 shows another analogous cross-section as the one illustrated in FIG. 2, but using an encapsulation member provided with transversal grooves.

The ring can also be provided with transversal grooves 10a (FIG. 5) in its upper surface, which can be applied either in combination or not with said longitudinal grooves.

Along the encapsulation border, i.e. along the respective line perpendicular on the points B and D, and preferably also on the point C, the member 4 is provided with a sharp profile which extends along an encapsulation borderline of the element 1 and which is provided to form a tight contact between that member 4 and the sheet shaped element 1, when pressed thereon.

Figure 3:
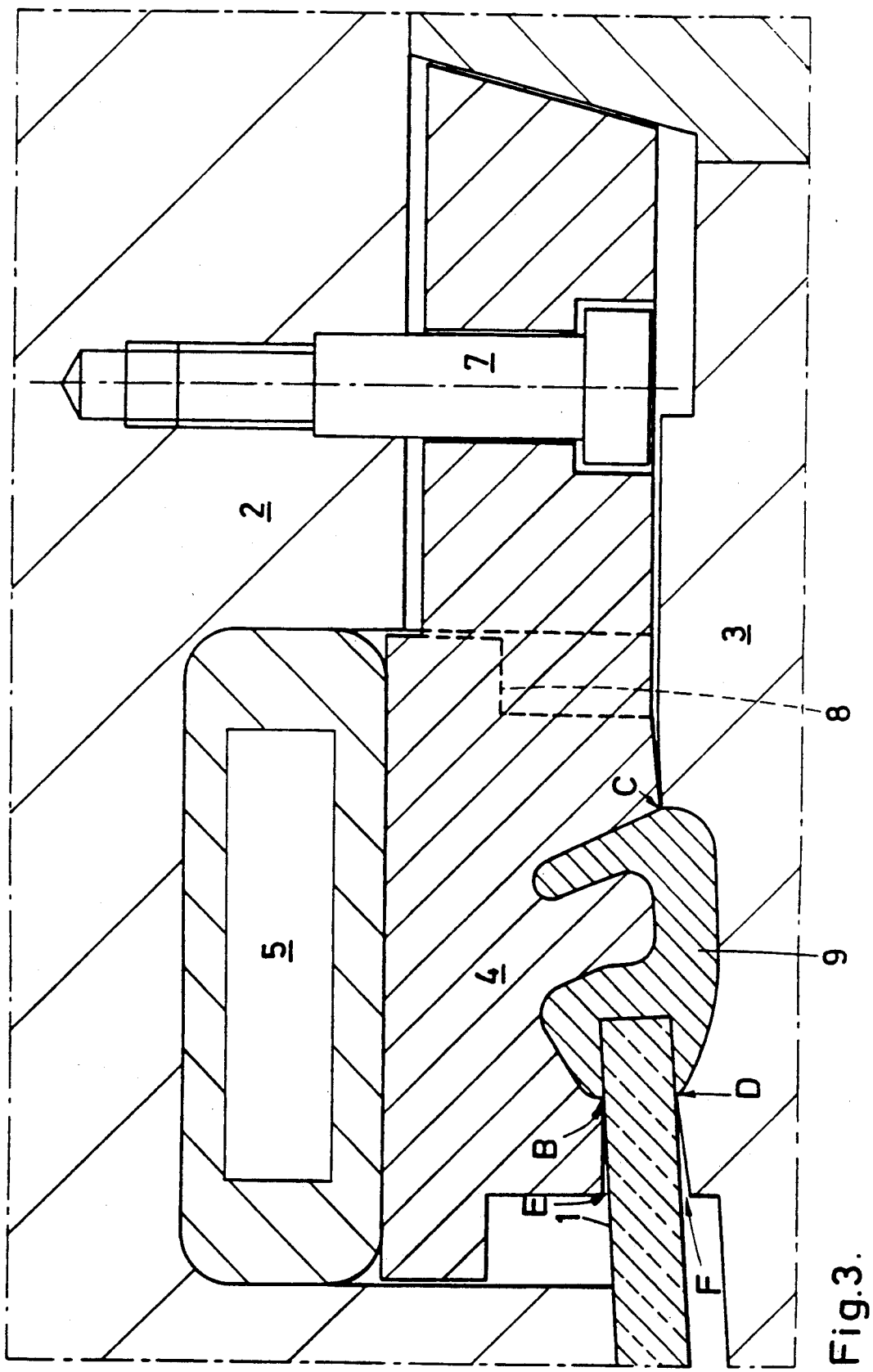
FIG. 3 shows the same device but now in its closed state.

The land faces of the ring are preferably a little bit oblique (0.5° to 1°), as can clearly be seen in FIG. 3 (lines EB, FD and CG) where the mould is closed.

The member 4, and the undermould 3 are provided with end faces 16 and 15 respectively. When the member 4 is moved towards the undermould, it is centered by means of the oblique end faces 16 and 15, in order to prevent a partial joint displacement. Those end faces 16 and 15 must not necessarily extend over the whole circumference of the member 4 or of the undermould 3, but can be distributed, even in an irregular manner, over the circumference of the member.

By closing the mould the bellows are pressureless and the uppermould is brought down towards the undermould. Due to the profile in the ring and in a part of the undermould, a cavity 9 will be formed around the border of the element 1 to be encapsulated. That cavity, which is connected to the buffer 12, is provided in order to form a ring of elastomer, for example polyurethane elastomer, around the circumference of the sheet of shaped element by injecting said moulding substance, for example, a liquid reactive polyurethane mixture, into that cavity.

When the whole circumference of that shaped element has to be encapsulated, the cavity extends along the whole circumference. When only a part of the element has to be encapsulated, either the ring extends only over the part to be encapsulated or the cavity extends only over a part of the ring.

When the mould is closed, the bellows are blown up, for example by means of compressed gas or liquid. The bellows can be blown up to a pressure of for example 40 bars by means of oil.

By blowing up the bellows a force which is equally divided over the surface of the ring, will be applied on that ring and will press it against the border of the sheet shaped element, for example a sheet of glass. By pressing the ring around the glass, first the glass is pressed against the surface of the undermould. When the glass is curved and the radius thereof is not equal to the nominal radius as given by the mould, the glass will, under influence of the applied pressure, first be deformed up to the radius of the undermould.

Suppose now that, particularly in point B, the average thickness of the glass is higher than the nominal thickness. Under influence of the pressure applied by the bellows on the ring, the flexible metal ring will first touch the glass in point B before the land face of the ring touches the undermould in point C. Due to the fact that the ring has oblique land faces, only the point B will first touch the glass. The pressure applied by the bellows on the ring will press the part BE of the ring against the glass. Due to the fact that an elastically deformable ring is used, the applied force will cause that ring to turn around point B until the land faces of the ring touch the undermould. Again due to the obliqueness of the land face the ring will first touch the undermould in point C. The flexible metal ring is now elastically deformed and will not closely follow the variation of the glass thickness around the edges of the glass sheet.

When the average thickness of the glass is lower than he nominal thickness, the flexible metal ring will touch first the undermould in point C before the land face of the ring will touch the glass. Under pressure of the bellows the ring section will turn around point C until the land faces of the ring will touch the glass.

Due to the elasticity and the deformation of the ring, it will tightly pack the glass around its edges. Along lines, which extend perpendicular to the point B, respectively C, the glass is tightly packed into the ring, irrespective of some deformation which may occur on the glass along those lines.

Due to the tight packing, the liquid reactive polyurethane mixture which is injected into the cavity 9 can not leak through the contact points between the ring and the glass, thus rendering deflashing no longer necessary.

If the ring is provided with longitudinal and/or transversal grooves (10) the flexibility thereof is improved, thus providing a better bending and deformation of the ring. When the bellows apply a pressure on the ring provided with grooves, those grooves will be their narrowing or extension enable a better bending of the ring around the border of the sheet of glass.

The member 4 can be applied either around the whole circumference of the sheet of glass, for example in case that the sheet of glass is a windscreen of a vehicle, or around a part of the border of a said sheet of glass, for example in case that the sheet of glass is a lateral window of a vehicle the member will be applied only at one side of the sheet of glass.

After that the ring has been applied on the border of the sheet shaped element, the moulding substance formed for example by a liquid reactive polyurethane mixture is injected into the cavity 9. After hardening of that substance, and when the bellows are depressurised, the uppermould is raised, removing the member 4 from the sheet shaped element.

In the described embodiment the ring is fixed on the uppermould. It will be clear that the method according to the invention can also be applied when the ring and the bellows are part of the undermould.

It will be clear that the invention is not restricted to the described preferred embodiment and that several variations are possible within the scope of the present invention.

What is claimed is:

1. A device for at least partially encapsulating a border of a substantially sheet shaped element, said device comprising:
   a mould having at least a first and a second part for pressing said element therebetween, said first part comprising an elastically deformable member which is slidably mounted in said first part;
   urging means for urging said member against said element and against said second part of the mould, and for thereby deforming said member so that a tight contact is realized between said member and said element, said second part and said member defining a cavity around said border when said member is pressed against said element and against said second part of the mould; and
   injection means for injecting a moulding substance into said cavity.

2. A device as claimed in claim 1, wherein said member is formed by an elastically deformable metal ring.

3. A device as claimed in claim 2, wherein said metal ring is a deformable floating steel ring.

4. A device as claimed in claim 3, wherein at least a first land face of said member is oblique with respect to the element on which it is pressed.

5. A device as claimed in claim 4, wherein at least a second land face of said member is oblique with respect to the second part of said mould on which it is pressed.

6. Device as claimed in claim 3, wherein said urging means comprise bellows which extend along said member.

7. A device as claimed in claim 3, wherein said member is provided with longitudinal grooves in a surface opposite to one coming into contact with said element.

8. A device as claimed in claim 3 wherein said member is provided with transversal grooves in a surface opposite to the one coming into contact with said element.

9. A method for at least partially encapsulating a border of a substantially sheet shaped element, comprising the steps of:
   a) inserting said element in an opened mould having at least a first and a second mould part;
   b) closing said mould by bringing said mould parts together;
   c) pressing an elastically deformable member, which is slidably mounted in said first mould part, against said second mould part and against said element, thereby to define a mould cavity around at least a part of the border of said element by means of said member and said second mould part whereby irregularities in said element along said cavity are compensated for by elastic deformation of said member so that a tight contact is realized between said member and said element;
   d) injecting a moulding substance in said mould cavity;
   e) allowing said moulding substance to harden;
   f) opening said mould; and
   g) removing said element from the mould.

* * * * *